United States Patent [19]

Houston

[11] Patent Number: 4,484,818
[45] Date of Patent: Nov. 27, 1984

[54] APPARATUS AND METHOD FOR DETECTING THE LOSS OF VACUUM

[75] Inventor: John M. Houston, Schenectady, N.Y.

[73] Assignee: General Electric Company, Schenectady, N.Y.

[21] Appl. No.: 354,996

[22] Filed: Mar. 5, 1982

[51] Int. Cl.$^3$ .................. G01N 21/17; G01N 21/55
[52] U.S. Cl. .................................... 356/432; 340/644; 356/445
[58] Field of Search ............... 356/432, 445; 73/49.3, 73/705; 340/605, 644, 626; 250/227, 231 R, 231 P

[56] References Cited

U.S. PATENT DOCUMENTS 4,354,105 10/1982 Spirig ........................... 250/231 R
4,379,226 4/1983 Sichling et al. ...................... 73/705

Primary Examiner—Vincent P. McGraw
Attorney, Agent, or Firm—Lawrence D. Cutter; James C. Davis, Jr.; Marvin Snyder

[57] ABSTRACT

In high voltage vacuum interrupters and similar devices, it is desirable to provide some indication that vacuum conditions within the containment vessel have degraded. Advantage is taken of the fact that metallic barium forms a substantially opaque and reflective film but that barium oxide, formed as a result of air penetrating the vacuum, forms a nonreflective and substantially transparent film. In the present invention, a housing is provided with means for attachment to the vacuum vessel with the housing having at least one light-transmissive portion. A barium film is disposed on at least one of these light-transmissive portions and means for detecting changes in the optical characteristics of the barium film are also provided. In this way, degradation in vacuum condition, evidenced by oxidation of the barium film, results in a signal indicating that contamination of the vacuum condition has occurred.

14 Claims, 6 Drawing Figures

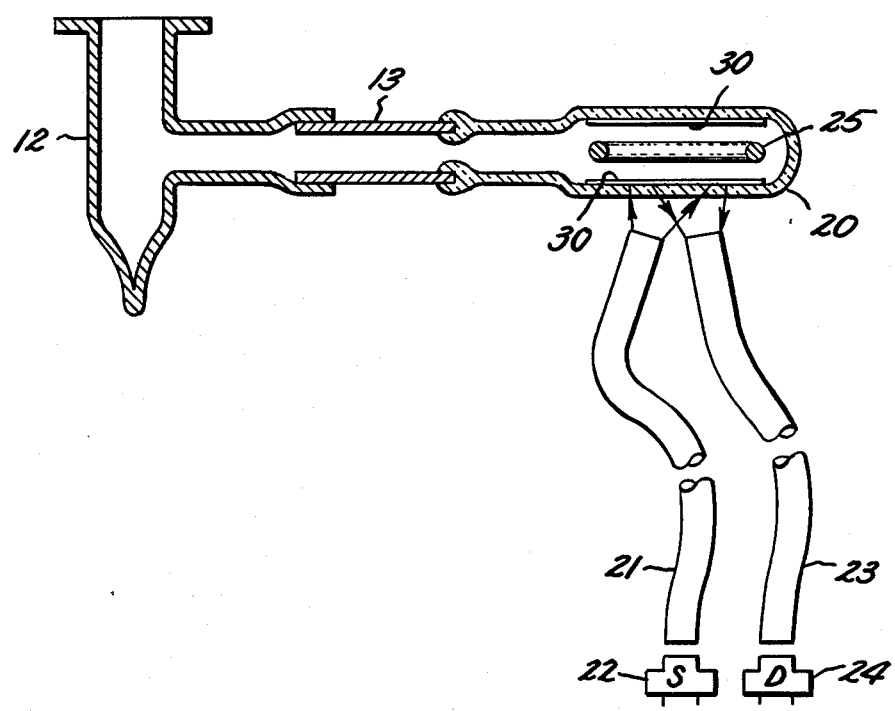
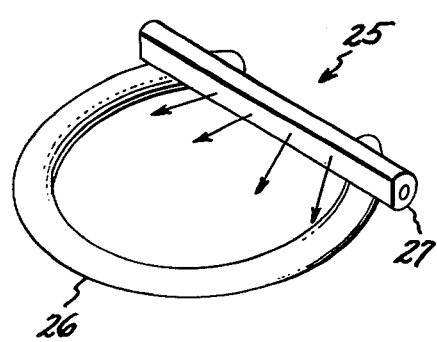
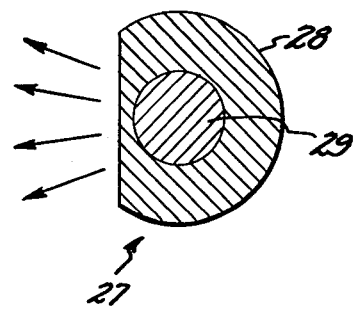

APPARATUS AND METHOD FOR DETECTING THE LOSS OF VACUUM

BACKGROUND OF THE DISCLOSURE

The present invention relates to devices for detecting contamination of the vacuum in a closed vessel. In particular, the present invention relates to an apparatus for indicating vacuum degradation in high voltage circuit current interrupters.

High voltage vacuum circuit breakers are employed in electrical distribution systems to interrupt current under fault conditions. Vacuum conditions are employed in the vicinity of the contacting electrodes to further enhance the ability of these switch devices to interrupt high voltage currents. However, these circuit breaker devices are employed under field conditions and are required to sustain a vacuum, typically less than 0.01 torr, for extended periods of time, typically in the range of 20 years or more. Under these conditions and over this period of time, it is possible that a small number of these switches could develop air leaks, thereby degrading the vacuum condition and rendering the device incapable of proper interruption of some high voltage current conditions. Accordingly, it is desired to be able to monitor these switches in an efficient, reliable and economical manner to ensure that loss of vacuum has not occurred. Any instrumentation device monitoring the vacuum condition must be simple and reliable and must operate so that the performance of the circuit breaker is not affected by the presence of the monitoring device. Additionally, the monitor must be reasonably low in cost and must be capable of determining vacuum conditions during long quiescent periods when the circuit breaker operates in a normal, current-conducting mode with the contacts closed.

It is known by experts in the vacuum tube arts that relatively large leaks in vacuum envelopes may be detected by visually observing changes in the appearance of a barium getter film deposited on the glass wall of the vacuum envelope. However, this method of vacuum monitoring is not useful for observing the operation of vacuum switches because such switches are normally completely enclosed in metal with dry air or $SF_6$ insulating the switch from the surrounding metal enclosure. Accordingly, in such current interrupters, the vacuum switch is not visible. Additionally, many of these circuit interrupters are mounted at locations fairly high off the ground. Accordingly, climbing to their level would be both awkward and dangerous while the line is energized. It is further noted that it is generally under conditions when the line is energized that one would most likely wish to determine the state of the vacuum conditions within the interrupter. Furthermore, high voltage vacuum switches do not employ barium getters because barium is a low work function material and if it were to become deposited on the electrodes, it would cause a large loss in voltage stand-off ability. Accordingly, for this reason it has therefore been appreciated that the use of barium in high voltage vacuum interrupters is generally inappropriate.

In U.S. Pat. No. 4,021,702, issued May 3, 1971 to Manfred Rimmrott, it is also observed that it is desired to detect the presence of a degraded vacuum condition in electrical vacuum interruption devices. In this invention, it appears that the infrared radiation eminating from the hot electrodes within the vacuum switch is monitored. However, the apparatus in this patent is only usable as the switch is opened. It provides no warning of loss of vacuum during quiescent switch conditions. It is noted that for the circuit interrupter switch as contemplated herein that these switches may, in fact, close for many months before fault conditions arise to trigger their actuation.

In U.S. Pat. No. 3,594,754, issued July 20, 1971, to Roy E. Voshall, there is also apparently disclosed an apparatus for detecting loss of vacuum. However, in this apparatus, a voltage is applied between one electrode and a floating shield with detection being based upon current flow to the shield.

The above-described effects concerning barium films are described, for example, in Mitsubishi publication number L-32645A-IT 6901. It should furthermore be pointed out that any instrumentation employed in the detection and monitoring of vacuum conditions in high voltage circuit interrupters must also achieve isolation between the ground and the high voltage circuit so that individual monitoring the vacuum conditions are not exposed to high voltage conditions.

SUMMARY OF THE INVENTION

In accordance with a preferred embodiment of the present invention, an apparatus for detecting the loss of vacuum in a vessel comprises a housing distinct from the vessel and with means for attaching the housing in fluid communication with the vacuum region of the vessel. The housing also possesses at least one light-transmissive portion on the interior of which a barium film is disposed. Furthermore, the present invention comprises means for detecting changes in the optical characteristics of the barium film. In another embodiment of the present invention, the housing possesses opposing wall portions each of which is light-transmissive with a barium coating on at least one of these housing wall portions. In this latter embodiment, optical transmissivity is the characteristic of greatest interest. However, in the present invention it is preferred that the reflectivity of the film be employed since this provides a greater fail-safe system for monitoring vacuum conditions.

In accordance with another embodiment of the present invention, a method for detecting the loss of vacuum in a vessel comprises determining the optical reflectivity or transmissivity of a barium film disposed on an interior, light-transmissive portion of a housing distinct from, but in fluid communication with the vacuum in the vessel. In this way, the barium material does not interfere with switch operation.

Accordingly, it is an object of the present invention to provide an economical, reliable means for continuously monitoring the vacuum conditions in a high voltage vacuum circuit interrupter.

It is also an object of the present invention to provide a means for quantifying the degree of vacuum degradation in systems employing vacuum vessels.

Lastly, it is an object of the present invention to provide a method for detecting and quantifying loss of vacuum in vessels, particularly vacuum circuit interrupter housings.

DESCRIPTION OF THE FIGURES

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawings in which:

FIG. 4 is a partial cross-sectional side elevation view of an apparatus of the present invention in which the reflectivity characteristics of a barium film are specifically monitored.

FIG. 5 is an isometric view illustrating a getter assembly.

FIG. 6 is a cross-sectional, end view of a particular form of barium getter.

DETAILED DESCRIPTION OF THE INVENTION

Figure 1:
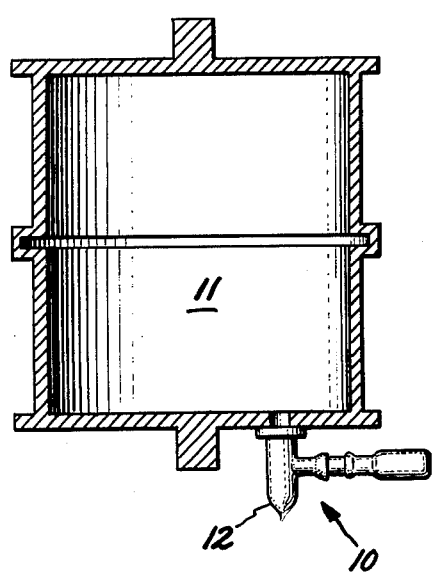
FIG. 1 is a cross-sectional, side elevation view illustrating the incorporation of the device of the present invention in a high voltage vacuum interrupter.

FIG. 1 generally illustrates the positioning of the present invention when employed in a high voltage barium circuit interruption device 11. Here the instant apparatus 10 is shown connected to conventional copper pinch-off lead 12 of switch 11. This arrangement is shown in greater detail in FIG. 3. However, it is here noted that in the present invention pinch-off 12 is typically copper and is connected to the housing or pillbox structure 20 or 20' of the present invention by means of a metal conduit 13 typically comprising a material such as FERNICO ®.

Figure 2:
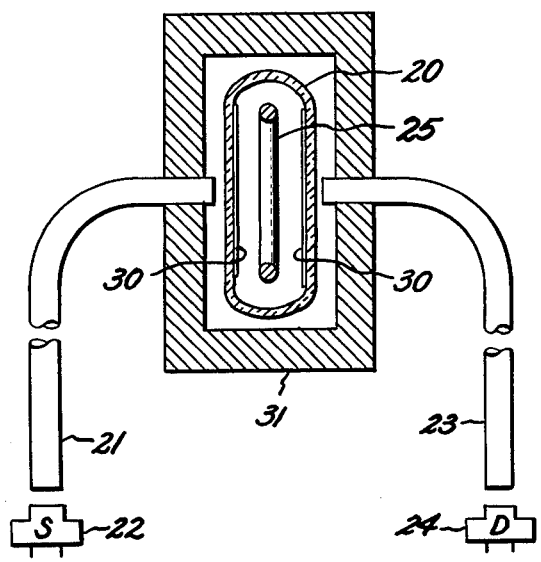
FIG. 2 is a partial cross-sectional, side elevation view of an apparatus in accordance with the present invention in which the light-transmissivity characteristics of a barium film are employed to monitor vacuum conditions.

FIG. 2 illustrates one embodiment of housing 20 of the present invention in which the light-transmissivity characteristics of barium film 30 are employed. This is in contrast to the embodiment illustrated in FIG. 4 in which the reflectivity characteristics of the film are of paramount consideration. In particular, in FIG. 2, it is seen that pillbox 20 is contained within protective housing 31 which also serves to support fiber optic conduit means 21 and 23. Pillbox housing 20 is particularly characterized in having at least two light-transmissive portions, and, in fact, housing 20 preferably comprises glass. Additionally, housing 20 is characterized in that it has two opposing light-transmissive wall portions arranged in close but noncontacting relationship. It is in the region in which these two light-transmissive surfaces are near to one another at which a barium film 30 is disposed. For best results, this film is preferably disposed on both adjacently-disposed interior housing wall portions. Adjacent to, but exterior to the window portions of pillbox housing 20, there are fiber optic means 21 and 23 disposed as shown so that light source 22 (labeled S), such as a light-emitting diode, operates to direct light onto housing 20. In a similar fashion, fiber optic means 23 operates to transmit light received through housing 20 to photodetector 24 (labeled D) comprising a device such as a photodiode or phototransistor. Also contained within housing 20 is barium source 25, more particularly described below in FIGS. 5 and 6. Barium source 25 is suspended in pillbox housing 20 by small legs (not shown) so that metallic barium can be evaporated onto one or both of the light-transmissive window portions of housing 20. Evaporation of the barium is done immediately after sealing off the vacuum switch. However, it should also be noted that the barium source also generally receives a preliminary heating prior to seal off in order to out gas it.

Figure 3:
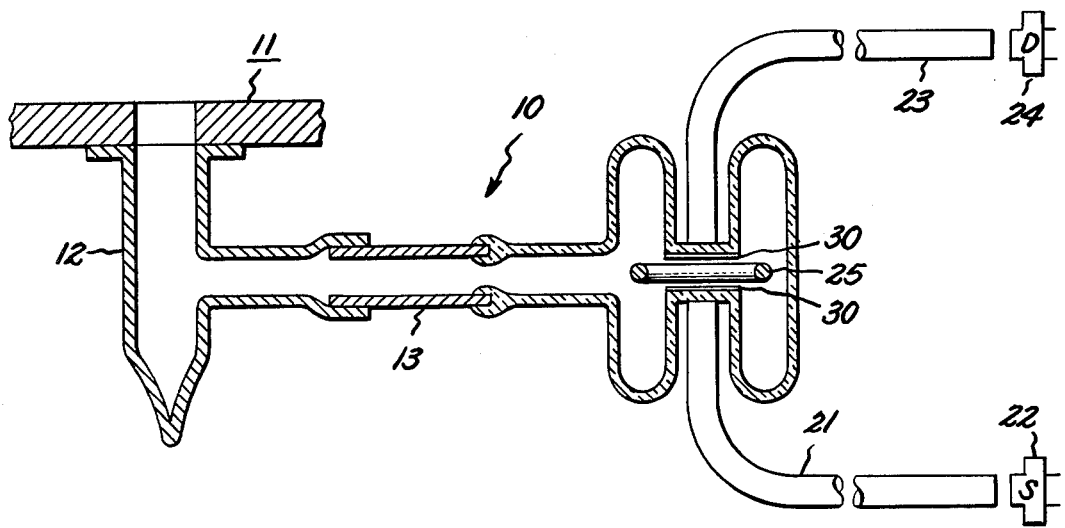
FIG. 3 is a partial cross-sectional, side elevation view of an apparatus similar to that shown in FIG. 1.

FIG. 3 illustrates a detailed embodiment of the present invention similar to that shown in FIG. 1 and 2. However, FIG. 3 particularly shows the preferred method of coupling pillbox housing 20 or 20' with copper pinch-off seal 12 of vacuum switch 11. Obviously, the interior of the housing 20 or 20' is in fluid communication with the interior of vacuum switch 11 and, in particular, it too possesses interior vacuum conditions, preferably below approximately $10^{-2}$ torr. However, FIG. 3 more particularly shows a doubly reentrant form of housing 20' in which opposing light-transmissive portions of the housing are disposed in an adjacent position with surrounding portions of the housing serving as at least a partial support for fiber optic cable connection means 21 and 23.

In the embodiment shown in FIGS. 2 and 3, based upon the transmissivity characteristics of barium and barium oxide, light from light source 22 is continuously supplied at one side of housing 20 or 20' and is received at the other side by means of photodectector 24. In this embodiment, barium film 30 is, under normal conditions, a silvery reflective coating and no light is transmitted to the photodector. However, if degradation in the vacuum in switch 11 occurs, and, more particularly, if the leakage causes a pressure increase to above approximately $10^{-2}$ torr, then oxygen present in the contaminating atmospheric gases cause the barium film to oxidize converting it onto a light-transmissive film of barium oxide. This condition is sensed by photodetector 24 thereby providing means to signal that there has been a degradation in vacuum conditions. Thus, under normal conditions, in this embodiment, there is no signal output from the photodetector. However, this transmissivity-based system exhibits a large ratio of light change between high vacuum and leak conditions, since the light output intensity changes from essentially zero to a finite value. This ratio is larger than the corresponding value seen in the embodiment of FIG. 4.

FIG. 4, on the other hand, illustrates a reflectivity-based embodiment of the present invention. In this embodiment, light from light source 22 impinges upon a light-transmissive portion of housing 20 and is reflected back outward from barium film 30. The reflected light is then detected by means of photodetector 24. In this embodiment, under normal operating conditions, the barium film is a silvery metal reflector which reflects incident light through detector 24. Thus under conventional operating conditions there is a constant light signal. Thus this embodiment has the advantage that an output signal is present when all conditions are normal and that it vanishes when there are vacuum problems or even when there is a failure in either light source 22 or photodetector 24. This is an advantage over the transmissivity-based system where the failure or an LED or photodiode might not be noticed since the transmissivity-based system normally has zero output. On the other hand, in this embodiment under vacuum degradation conditions, oxygen enters the system and causes the formation of a translucent barium oxide film which significantly reduces the intensity of light received by photodetector 24. However, the change in light intensity under these conditions is generally not as great as that found in the transmissivity-based system. However, as pointed out, the reflectivity-based system offers significant fail-safe advantages.

Barium film 30 of the present invention is preferably provided by means of getter assembly 25 comprising a KIC getter 27 connected, as by welding, to a metal wire loop 26 so as to form a closed electrical circuit. Getter assembly 25 is disposed within housing 20 or 20' and suspended therein by any convenient means, such as by wire feet or stand-offs (not shown). Getter assembly 25, in the form of a wire loop, is conveniently heated from the exterior by well-known high frequency electromagnetic induction methods from outside the vacuum chamber and housing. KIC getter 27 is more particularly shown in cross-sectional end view in FIG. 6. Here it is seen that it comprises a length of hollow iron wire 28 containing metallic barium 29. One side of the iron wire is thinned, as by filing, so that it bursts when the getter wire is sufficiently heated. The barium then evaporates out of the thinned side of getter 27 as suggested by the arrows. Getter 27 forms with wire loop 26 (preferably nickel) a closed electrical circuit which is heated as described above. Such barium sources are widely used as getters in vacuum tube devices such as receiving tubes and television cathode ray tubes. Getter assembly 25 is used to evaporate metallic barium which cools and forms the desired film on housing 20 or 20'. Evaporation of the metallic barium is preferably accomplished just after seal-off of the vacuum switch. However, barium source 25 generally receives some preliminary heating prior to seal-off in order to out gas it.

In the present invention, while the embodiments shown in FIG. 2, 3 and 4 all employ fiber optic cables, it should be appreciated that the present invention does not require the fiber optic cables and that in some embodiments of the present invention the light source and detector may be located in relative close proximity to pillbox housing 20 or 20'. However, it should also be noted that the fiber optic cables employed in the present invention are particularly applicable to situations in which vacuum conditions in high voltage devices are being monitored. The use of fiber optic cables provides a significant amount of high voltage electrical isolation. Accordingly, the light source and photodetector may be easily maintained at ground potential with the further advantage that no electrical power is required at the high potential by the monitor of the present invention.

From the above, it may be appreciated that the present invention provides an inexpensive, reliable, fail-safe and easily implemented method and apparatus for monitoring vacuum conditions. It is further seen that the present invention is particularly applicable to monitoring vacuum conditions in high voltage electrical circuit interruption devices in which substances such as barium are generally not employed because of electrode contamination. However, the construction and connection of the present invention with such devices alleviates any problems associated with this form of electrode contamination. Furthermore, the monitor of the present invention is particularly advantageous in that the photodetector may be readily maintained at ground potential. The present invention is also advantageous in that it requires no additional electrical leads into the vacuum switch to provide the necessary monitoring. Additionally, it requires no additional electrical power at high potentials and does not degrade circuit breaker reliability. The only required modification to circuit breaker 11 is in pinch-off lead 12.

By way of example, and not limitation, in one set of tests performed concerning the present invention, the light source employed was a light-emitting diode operating at approximately 940 nanometers (infrared) and at a current rating of approximately 30 milliamperes. A fiber optic cable approximately 10 feet long carried this light to the barium film. The reflected or transmitted light was then supplied to a photodiode by means of another fiber optic cable several feet long. The fiber optic cables were 19-fiber Galileo cables with an active diameter of approximately 0.5 millimeters. The light-emitting diode was driven with direct current and therefore not modulated. Using alternating current modulation at audio frequencies is, however, desirable since it would allow simpler, more stable amplifiers to be employed with the detector. Additionally, by using a narrow band receiver-amplifier, stray light conditions could be readily removed by filtering. In one test of the reflectivity-based system, the barium film turned from a dark, shiny mirror surface to an essentially invisible film in approximately one second. Under these conditions, the photodiode output level dropped from 30 millivolts to 6 millivolts during the oxidation of the barium film. Thus, it appeared that the reflected light intensity dropped by a factor of approximately 5. During these tests, the receiving fiber optic cable was in somewhat closer proximity to the film than the fiber optic for the light source. However, this is unimportant to the present invention and the system should work equally well with both fibers equidistant from the film.

As an example of the use of the present invention employed in a transmissivity-based system, a glass tube having a diameter of approximately 23 millimeters was disposed between the light source and detector and fiber optic coupling means were employed. With the tube in place and the barium unoxidized, the photodiode output level was zero, that is, no detectable light was transmitted. After the barium film was oxidized, the photodiode output level was 12 millivolts. In this tube, the barium film did not completely vanish when oxidized, that is, it appeared as a slight white haze. This fact plus scattering of light by the glass explains why the reading with barium oxidized is only about half that read in an air path (tube removed). However, the fact that the light goes from essentially zero to a finite value upon oxidation of the barium implies that detection of air leaks is nonetheless quite easily accomplished.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An apparatus for detecting the loss of vacuum in an electrical vacuum circuit interrupter, said apparatus comprising:

an evacuable housing distinct from said interrupter with means for attachment of said housing to said interrupter, said housing being in fluid communication with the vacuum of said interrupter, said housing having at least one light transmissive portion in a wall thereof;

a barium film disposed on at least one of said light transmissive wall portions on the interior of said housing;

means for detecting changes in the optical characteristics of said film said means employing light passing through said light transmissive wall portion.

2. The apparatus of claim 1 in which said barium film is deposited by getter means disposed within said housing.

3. The apparatus of claim 1 further including getter means for depositing said barium film.

4. The apparatus of claim 1 in which said housing possesses opposing wall portions, each being one of said light-transmissive wall portions, said opposing wall portions being configured to be in close, but noncontacting proximity to each other.

5. The apparatus of claim 4 in which each of said light-transmissive portions has said barium film disposed thereon.

6. The apparatus of claim 4 in which said detecting means comprises a light source for directing light onto the exterior of one of said light-transmissive wall portions and a photodetector for detecting the level of light transmitted through said housing.

7. The apparatus of claim 6 further including first fiber optic coupling means disposed between said light source and one of said opposed housing wall portions.

8. The apparatus of claim 6 further including second fiber optic coupling means disposed between the other of said opposed housing wall portions and said photodetector.

9. The apparatus of claim 1 in which said detecting means comprises a light source for directing light onto the exterior of said light-transmissive wall portion and a photodetector positioned so as to receive light reflected from said barium film back through said light-transmissive housing wall portion.

10. The apparatus of claim 9 further including first fiber optic coupling means disposed between said light source and said housing.

11. The apparatus of claim 9 further including second fiber optic coupling means disposed between said housing and said photodetector.

12. The apparatus of claim 1 in which said housing comprises glass.

13. A method for detecting the loss of vacuum in an electrical vacuum circuit interrupter, said method comprising the step of:
   determining the optical reflectivity of a barium film disposed on an interior, light-transmissive portion of a distinct housing in fluid communication with the vacuum chamber of said vacuum interrupter.

14. A method for detecting the loss of vacuum in an electrical vacuum circuit interrupter, said method comprising the step of:
   determining the optical transmissivity of a barium film disposed on an interior, light-transmissive portion of a distinct housing in fluid communication with the vacuum chamber of said vacuum interrupter.

* * * * *